United States Patent
Jain et al.

(10) Patent No.: US 9,990,020 B2
(45) Date of Patent: Jun. 5, 2018

(54) USE OF LINK LAYER DISCOVERY PROTOCOL-MEDIA ENDPOINT DISCOVERY TO AVOID FALSE LEGACY POWERED DEVICE DETECTION IN POWER OVER ETHERNET SYSTEMS AND NETWORKS

(71) Applicant: Aruba Networks, Inc., Sunnyvale, CA (US)

(72) Inventors: Kapil Jain, Bangalore (IN); Nitin Agrawal, Bangalore (IN); Arunachalaprabhu Gunasekaran, Bangalore (IN); Rangaswamy Ramaswamy, Bangalore (IN); Ritesh Kapahi, Bangalore (IN)

(73) Assignee: ARUBA NETWORKS, INC., Sunnyvale, CA (US)

( * ) Notice: Subject to any disclaimer, the term of this patent is extended or adjusted under 35 U.S.C. 154(b) by 133 days.

(21) Appl. No.: 14/792,949

(22) Filed: Jul. 7, 2015

(65) Prior Publication Data
US 2017/0010645 A1    Jan. 12, 2017

(51) Int. Cl.
*G06F 1/26* (2006.01)
*H04L 12/10* (2006.01)

(52) U.S. Cl.
CPC .............. *G06F 1/266* (2013.01); *H04L 12/10* (2013.01); *Y02B 60/43* (2013.01); *Y02B 60/44* (2013.01)

(58) Field of Classification Search
CPC .......... G06F 21/44; G06F 21/81; G06F 1/266; H04B 10/25753; H04W 52/0206; H04W 52/0261; H04W 52/0209; Y02B 60/43; Y02B 60/44; H02J 4/00; H04L 12/10
See application file for complete search history.

(56) References Cited

U.S. PATENT DOCUMENTS

| | | | |
|---|---|---|---|
| 7,724,650 B2 * | 5/2010 | Karam | H04L 1/22 340/425.2 |
| 7,774,628 B2 | 8/2010 | Hansalia | |
| 7,774,634 B2 | 8/2010 | Diab | |
| 8,199,906 B2 | 6/2012 | Hussain et al. | |
| 8,745,429 B2 | 6/2014 | Ghose et al. | |

(Continued)

OTHER PUBLICATIONS

"Administration Guide: Cisco Small Business 300 Series Managed Switch Administration Guide Release 1.3.5" *Cisco*. 2010-2013, all pages.

(Continued)

*Primary Examiner* — Terrell S Johnson
(74) *Attorney, Agent, or Firm* — Hewlett Packard Enterprise Patent Department

(57) ABSTRACT

Described herein are systems, devices, techniques and products for minimizing disruption to network systems due to false detection of a Power over Ethernet (PoE) Power Sourcing Equipment (PSE) as a Powered Device (PD). The disclosed systems, devices, techniques and products provide a way for a PSE to identify itself and avoid being detected as a legacy PD. The disclosed systems, devices, techniques and products further provide a way for a PSE to identify devices that do not require power from the PSE, such as another PSE or a device that is not a PD, and disable automatic PD detection, disable PoE, or otherwise prevent injection of power/current to the other device.

21 Claims, 14 Drawing Sheets

(56) References Cited

U.S. PATENT DOCUMENTS

| | | |
|---|---|---|
| 8,793,511 B1 | 7/2014 | Bishara |
| 8,943,344 B2 | 1/2015 | Giat |
| 2006/0078093 A1* | 4/2006 | Karam ................ H04L 1/22 379/24 |
| 2007/0110360 A1 | 5/2007 | Stanford |
| 2008/0005601 A1 | 1/2008 | Diab |
| 2011/0298428 A1 | 12/2011 | Liu |
| 2011/0320833 A1 | 12/2011 | Mohan et al. |
| 2013/0166708 A1 | 6/2013 | Schlichter et al. |
| 2013/0339760 A1 | 12/2013 | Zimmerman et al. |
| 2014/0115313 A1 | 4/2014 | Chen et al. |
| 2014/0129853 A1 | 5/2014 | Diab et al. |
| 2014/0195831 A1 | 7/2014 | Hamdi et al. |
| 2014/0258738 A1 | 9/2014 | Greenwalt et al. |
| 2016/0055354 A1* | 2/2016 | Jinaraj ................ G06F 21/81 726/36 |

OTHER PUBLICATIONS

"LLPD-MED and Cisco Discovery Protocol" *Cisco Systems: White Paper*. 1992-2006, all pages.

Quittek, et al., "Requirements for Energy Management" *Internet Engineering Task Force(IETF)*. Sep. 2013, all pages.

"Station and Media Access Control Connectivity Discovery" *IEEE Computer Society: Sponsored by the LAN/MAN Standards Committee*. Sep. 2009, all pages.

Yokohata, et al., "An Extension of the Link Layer Discovery Protocol for On-Demand Power Supply Network by PoE" $27^{th}$ *International Conference on Advanced Information Networking and Applications Workshops*. 2013, all pages.

* cited by examiner

USE OF LINK LAYER DISCOVERY PROTOCOL-MEDIA ENDPOINT DISCOVERY TO AVOID FALSE LEGACY POWERED DEVICE DETECTION IN POWER OVER ETHERNET SYSTEMS AND NETWORKS

CROSS REFERENCE TO RELATED APPLICATIONS

Not Applicable.

FIELD

The present disclosure generally relates to technologies for providing electrical power using network infrastructure. Specifically, various techniques and systems are provided for improving the availability and reliability of networks employing Power over Ethernet (PoE).

BACKGROUND

Power over Ethernet (PoE) is a technique for providing electrical power over an Ethernet network cable, typically in combination with also providing a network data connection over the same Ethernet network cable. Two Institute of Electrical and Electronics Engineers (IEEE) 802.3 standards provide details of standardized implementations of PoE, IEEE 802.3af-2003 (also referred to herein as 802.3af) and IEEE 802.3at-2009 (also referred to herein as 802.3at), with the 802.3at standard providing for higher power transmission and additional power management techniques as compared to the original 802.3af standard. Collectively or individually, the IEEE 802.3af and 802.3at standards may also be referred to herein as Standard PoE.

For PoE implementations, equipment that provides power to other devices over an Ethernet cable is referred to as Power Sourcing Equipment (PSE) or a Power Sourcing Equipment device (PSE device). A PSE device compliant with IEEE 802.3af and/or 802.3at standards may be referred to herein as a Standard PSE. Commonly used PSE devices are PoE compliant switches, which can provide power to various devices connected to the Ethernet ports of the switch over a twisted pair network cable. A PSE device which is a switch may be referred to herein as an endpoint or endspan. Endpoint devices typically include AC/DC power supplies for converting AC voltage as might be provided by, for example, an electrical outlet in the United States, to the DC voltages employed by PoE.

For networks which do not employ PoE switches, intermediary devices can be used to inject power onto an Ethernet cable so that one or more devices may be powered from the intermediary device. Such an intermediary device may be referred to herein as a midspan device or midspan injector. Midspan injectors are, commonly, devices that plug into AC line power or an AC/DC converter and have two network ports, one port for data communication with a network device, such as a switch, hub, or router, and another port that provides data and power to devices that consume power provided from the midspan injector. Midspan devices sit between Powered Devices and network communication devices, such as switches, hubs or routers, to inject power onto the Ethernet cable without disrupting the data also being transported over the cable.

A device that is powered by a PSE device is referred to herein as a Powered Device (PD). A PD compliant with IEEE 802.3af and/or 802.3at standards may be referred to herein as a Standard PD. Various network devices can be implemented as a PD. Commonly encountered PDs include Internet Protocol (IP) telephones, also referred to as Voice Over IP (VOIP) phones, IP video cameras, IEEE 802.11 compliant wireless access points, repeaters, and bridges, other network appliances, such as routers, firewalls, and other security appliances, and various access control systems. Virtually any electrical or network device, however, can be implemented as a PD, provided the device's power requirements are suitable for PoE. For example, thin clients and kiosks can be implemented as PDs and various sensors and controllers can be implemented as PDs. Certain client devices, such as computers, smart phones, and printers, may also be enabled as a PD.

For suitable devices that are not manufactured as a PoE compliant PD, a PoE splitter can be used to convert the single PoE data and power connection to separate data and power connections. In this way a PoE splitter is a type of PD itself. Such a device may appear similar to a midspan injector, with two network ports and a single power port. One network port will receive the PoE connection and separated data and power connections can then be passed to a non-PoE device to separately provide a data connection and a DC power connection.

Prior to establishment and adoption of IEEE 802.3af and 802.3at, various vendors established their own propriety methods for simultaneously transmitting power and data over a single Ethernet cable. Cisco Systems was one vendor that established a solution used by many early PD manufacturers. These pre-802.3af PoE techniques are referred to herein collectively and/or individually as Legacy systems. PDs that were compliant with a pre-standard proprietary PoE solution, but not an IEEE 802.3af and/or 802.3at standard, are referred to herein as Legacy Powered Devices (Legacy PDs). Legacy PDs are still common in the market today, so most Standard PSE devices support Legacy PDs while also being compliant with the IEEE PoE standards.

SUMMARY

Described herein are systems, devices, techniques and products for minimizing disruption to network systems due to false detection of Power over Ethernet (PoE) Power Sourcing Equipment (PSE) as a Powered Device (PD). The disclosed systems, devices, techniques and products provide a way for a PSE to identify itself and avoid being detected as a legacy PD. The disclosed systems, devices, techniques and products provide a way for a PSE to identify a device that does not require PoE power and disable automatic PD detection, disable PoE, or otherwise prevent injection of power/current to the other PSE. For example, the disclosed systems, devices, techniques and products provide a way for a PSE to identify another PSE and disable automatic PD detection, disable PoE, or otherwise prevent injection of power/current to the other PSE.

Embodiments disclosed include making use of Link Layer Discovery Protocol (LLDP) and, optionally, Media Endpoint Discovery (MED), for exchanging communications between devices to avoid false PD detection. Within the LLDP-MED framework, LLDP frames include Type, Length, and Value (TLV) messages that are transmitted by a device for direct receipt by a connected device to provide information, such as about the transmitting device's capabilities and/or requirements. Custom TLV messages may optionally identify a device as a device that does not require PoE power or as a device that is not a PD and, upon receipt of a TLV message identifying another device as a device that does not require PoE power or as a device that is not a PD, a PSE device may disable automatic PD detection for the port the TLV message was received on, disable PoE for the port the TLV message was received on, or otherwise prevent injection of power/current to the port the TLV message was received. For example, custom TLV messages may optionally identify a PSE device as a PSE device and, upon receipt of a TLV message identifying another device as a PSE device, a PSE device may disable automatic PD detection for the port the TLV message was received on, disable PoE for the port the TLV message was received on, or otherwise prevent injection of power/current to the port the TLV message was received.

In an aspect, methods are provided, such as computer implemented methods. Computer implemented methods of this aspect may be implemented on a network device, such as a network device compliant with a Power over Ethernet standard. In various embodiments, devices for performing methods of this aspect may include network hardware, such as physical network ports (e.g., RJ45 style ports), network transceivers, power supplies, etc., and may be configured to provide electrical power to the physical network ports to remotely power other devices.

In a specific embodiment, a method of this aspect comprises receiving a link layer discovery protocol (LLDP) frame at a network device, such as a power sourcing equipment (PSE) device; analyzing the LLDP frame, for example to identify a source of the LLDP frame as a device that does not require PoE power, such as another PSE device or a device other than a PD; identifying a physical network port of the network device, for example the physical network port that is associated with receipt of the LLDP frame; and disabling transmission of PoE power over the physical network port. In an embodiment, the network device is an endpoint device. In an embodiment, the network device is a midspan device.

In embodiments, the LLDP frame is a Link Layer Discovery Protocol Media Endpoint Discovery (LLDP-MED) frame. Optionally, the LLDP frame includes data indicating a power type as PSE. Optionally, the LLDP frame includes a custom type-length-value structure, and wherein the custom type-length-value structure includes data indicating a power type as PSE.

Optionally, various power standards are useful with the methods, devices, systems and products described herein. For example, in various embodiments, the network device is compliant with one or more Power over Ethernet (PoE) standards, such as a Legacy PoE standard, an IEEE 802.3af standard, and/or an IEEE 802.3at standard.

A variety of techniques are useful for preventing the transmission of power from one PSE device to another PSE device. Optionally, disabling transmission of power over the physical network port includes disabling legacy powered device detection for the physical network port. Optionally, disabling transmission of power over the physical network port includes disabling Power over Ethernet for the physical network port. Optionally, disabling transmission of power over the physical network port includes disabling automatic power negotiation for the physical network port. Optionally, disabling transmission of power over the physical network port includes disabling the injection of power or voltage by the physical network port.

Embodiments of the systems, methods, devices, and products described herein allow for repeating the exchange and analysis of messages to prevent false powered device detection, such as if a network connection is disabled, such as due to power loss or an interrupted or unplugged network link. In one embodiment, a method of this aspect further comprises detecting an interruption of a network connection at the physical network port; and enabling transmission of power over the physical network port. In an embodiment, a method of this aspect further comprises transmitting an additional LLDP frame including data identifying the network device as a device that does not require PoE power, such as a PSE device or a device other than a PD, for example where the additional LLDP frame at an additional PSE device causes the additional PSE device to identify an additional physical network port of the additional PSE device, such as where the additional network port is associated with receipt of the additional data packet, and where receiving the additional LLDP frame at the additional PSE device causes the additional PSE device to disable transmission of power over the additional physical network port.

In other aspects, systems are provided, such as systems for performing the methods described herein. In exemplary embodiments, a system of this aspect comprises one or more processors, and a non-transitory computer readable storage medium communicatively coupled or otherwise positioned in data communication with the one or more processors. In embodiments, the non-transitory computer readable storage medium includes instructions that, when executed by the one or more hardware processors, cause the one or more hardware processors to perform one or more of the methods described herein.

For example, in a specific embodiment, a system of this aspect comprises one or more processors, and a non-transitory computer readable storage medium coupled with the one or more processors and including instructions that, when executed by the one or more processors, cause the one or more processors to perform operations including receiving a link layer discovery protocol (LLDP) frame at a network device, such as a power sourcing equipment (PSE) device; analyzing the LLDP frame, for example to identify a source of the LLDP frame as another PSE device; identifying a physical network port of the network device, for example the physical network port that is associated with receipt of the LLDP frame; and disabling transmission of power over the physical network port. In an embodiment, the system comprises a network transceiver coupled to the one or more processors, such as a network transceiver for receiving one or more data frames. In an embodiment, the system comprises a power supply coupled to the one or more processors and/or a network transceiver, such as for providing power over a twisted pair cable to another device.

In other aspects, computer program products are provided, such as computer program products configured to achieve methods described herein. In exemplary embodiments, a computer program product of this aspect is a non-transitory computer readable storage medium comprising instructions that, when executed by one or more hardware processors, cause the one or more hardware processors to perform one or more of the methods described herein.

For example, in a specific embodiment, a computer program product of this aspect comprises a non-transitory computer readable storage medium comprising instructions that, when executed by one or more processors, cause the one or more processors to perform operations including receiving a link layer discovery protocol (LLDP) frame at a network device, such as a power sourcing equipment (PSE) device; analyzing the LLDP frame, for example to identify a source of the LLDP frame as another PSE device; identifying a physical network port of the network device, for example the physical network port that is associated with receipt of the LLDP frame; and disabling transmission of power over the physical network port.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

Illustrative embodiments of the present invention are described in detail below with reference to the following drawing figures.

DETAILED DESCRIPTION

Figure 1:
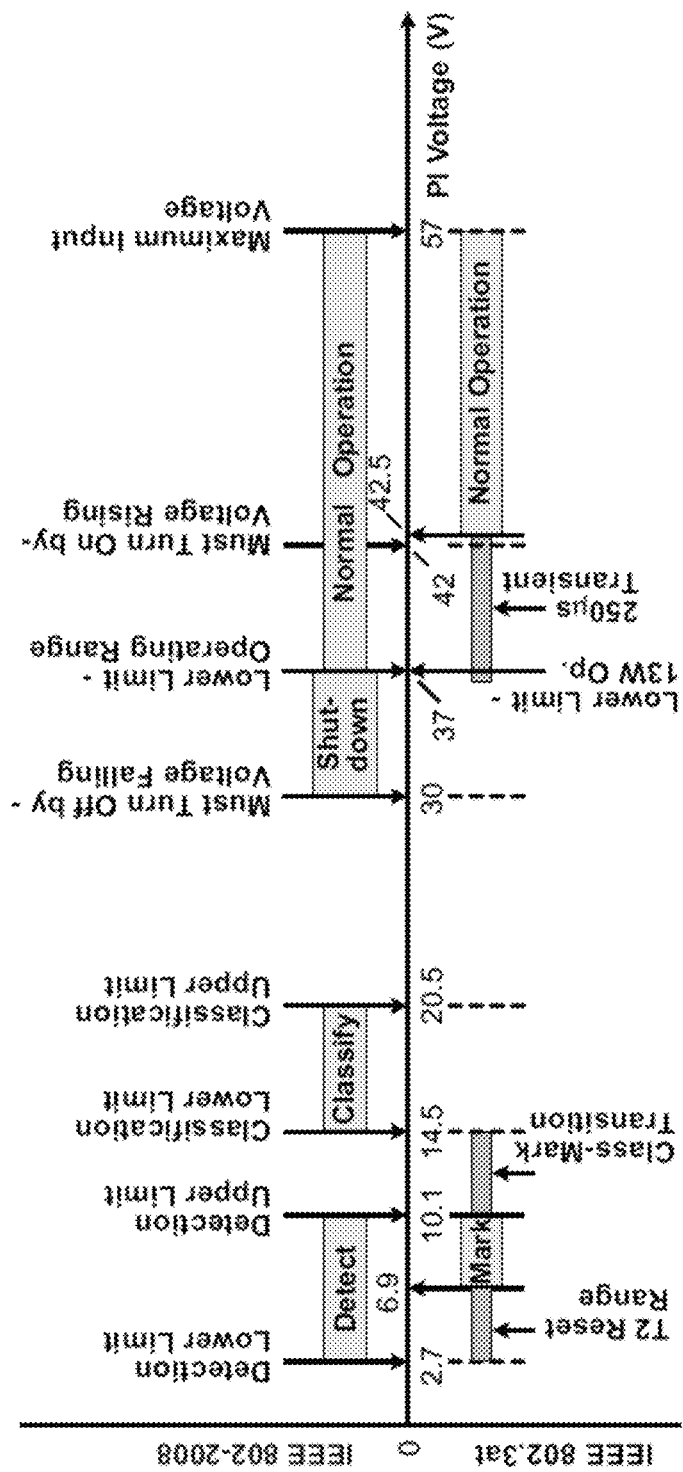
FIG. 1 provides an overview of the PoE threshold voltages.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, an algorithm, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Figure 2:
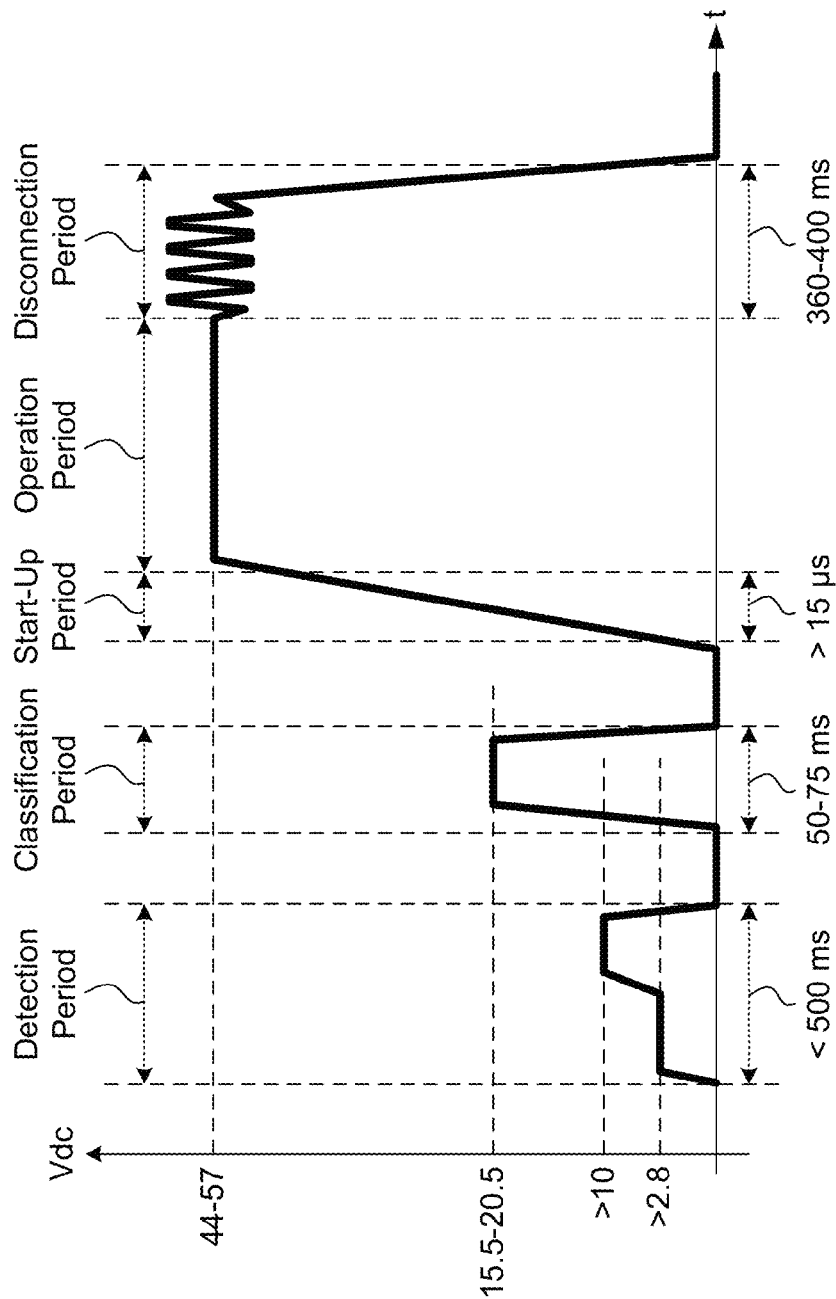
FIG. 2 provides an overview of the PoE detection sequence.

The IEEE 802.3at standard defines methods of safely powering PDs over a cable and then removing power if a PD is disconnected. The process proceeds through an idle state and three operational states of detection, classification, and operation. The PSE leaves the cable unpowered (idle state), while it periodically determines whether something has been plugged in (detection). The low power levels used during detection are unlikely to damage devices not designed for PoE. If a valid PD signature is present, the PSE may inquire how much power the PD requires (classification). The PSE may then power the PD if it has adequate capacity (operation). FIG. 1 provides an overview of the PoE threshold voltages and FIG. 2 provides an overview of the PoE detection sequence.

IEEE 802.3af/IEEE 802.3at Line Detection. Before power is applied to a PD, the PoE standard dictates that the PSE device must first ensure that a valid PD is connected. This process is referred to as "line detection" and involves the PSE sending a small amount of power over the Ethernet cable and then listening for a specific 25 kΩ signature resistance. Detection of this signature indicates that a valid PD is connected and that provisioning power to the device can commence.

Legacy Detection. The legacy detection method is designed to detect passive components on a regular DC to DC power supply input that is being used for pre-standard PDs. Legacy detection is designed to detect a variety of pre-standard PDs with a wide range of input capacitance, different DC input levels, and different startup delay times. In some implementations, Legacy detection is designed to detect and power many different types of pre-standard PDs.

Universal Detection. For PSE devices configured for both Standard PD detection and Legacy PD detection, the detection sequence generally operates as follows. Prior to detection, the PSE searches for connected devices continuously as long as a device is not connected. Once a device is connected, the Standard detection occurs and if the Standard detection passes successfully, the PSE classifies the PD and powers up the port. If Standard detection fails and Legacy detection is enabled, then the PSE performs Legacy detection. If Legacy detection passes successfully, then PSE then powers up the port. If Legacy detection fails, the PSE does not turn on the power and a new detection cycle begins.

Challenges to this process exist, however, because there are a large variety of Legacy PDs. For example, different DC to DC front ends exist in various legacy PDs, so legacy detection has a wider detection range than Standard detection. Thus, it is possible for devices that are not Legacy PDs to present a signature to a PSE, such as bus capacitance, that appears to be a valid Legacy PD signature. For example, when a PSE device is connected to another PSE device, one PSE device may falsely present a legacy PD signature to the other, and PoE power is provided to the PSE device that falsely presents the Legacy PD signature. This can be catastrophic for a number of reasons, and may result in interruptions to network and power services at the PSE device that was falsely detected as a Legacy PD.

For example, the PSE device that gets detected as false PD can end up getting powered off completely because of the Power Supply protection built into the system, as a result of receiving PoE power from the corresponding PSE device on the remote end. This may effectively terminate network connections to all devices connected to the shutdown PSE device.

As another example, the PSE device that gets detected as false PD can end up not providing power to all of the PDs connected to the device, because of protection built into the PoE controller used. This may result in mission critical hardware, such as closed circuit video and VOIP devices being shut down without notice.

Further, there is a continuous power dissipation between the two PSEs when operating in such a faulty state. For example, if the PSE is supplying 20 mA at 55 V there is a continuous power dissipation of 1.1 W between the two ports. The continuous power dissipation can also cause reliability issues in the components of the system.

These difficulties are further exacerbated because, in some instances, the false PD detection may be intermittent or the problems associated with providing PoE power to the PSE may not occur immediately. For example, one PSE may sometimes but not always detect another connected PSE as a Legacy PD. Additionally, the power dissipation may not be immediately or always problematic. Further, the PSE that is falsely detected as a Legacy PD system may operate normally for some period of time before any protection is activated or the PSE is shut down. For example, power down due to false PD detection can occur weeks or months after initial system configuration and testing, which can further exacerbate the challenges in identification of the source problem, particularly once tested configurations are distributed to a number of field locations.

Tracing the origin of any of the above issues may also be difficult and require significant time and effort. For example, network administrators are challenged to isolate the problem especially when multiple vendors' PSE devices are involved. Further, since the problem signature may be very random in nature, this may result in significant frustration and effort in identifying the root cause. Previous efforts for solving this issue include manual configuration, but with the random nature of the problem and growing need for ongoing connectivity in a given network, this is not a scalable solution.

The techniques described herein provide a reliable and efficient way to overcome the above issues. For example, connected PSE devices may exchange messages with one another to allow them to identify each other as a PSE device. Upon this identification, each PSE device will, for example, disable PoE power to the port the other PSE device is connected to. Various specific embodiments will be now set forth.

Figure 3:
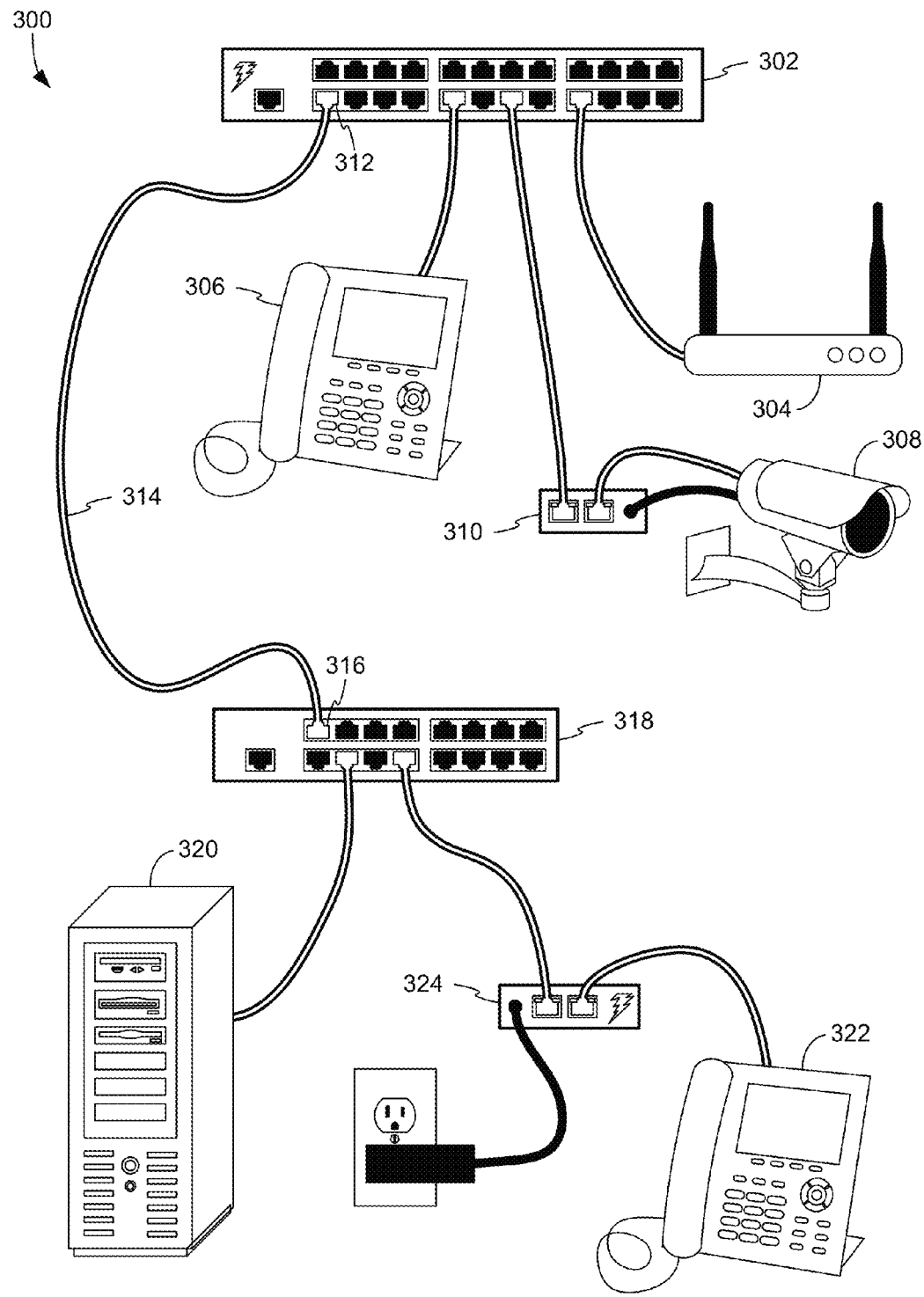
FIG. 3 provides an illustration of an example network communications environment, in accordance with some embodiments.

FIG. 3 provides an overview of an exemplary network environment 300. Network environment 300 includes PSE switch 302, access point 304, VOIP phone 306, IP camera 308, power splitter 310, switch 318, server 320, VOIP phone 322, and midspan power injector 324.

As illustrated, access point 304 is a PD that receives power from PSE switch 302. VOIP phone may, for example, be a Legacy PD and receive power from PSE switch 302. IP camera 308 is not a PD, but power is provided from PSE switch 302 to IP camera 308 by way of power splitter 310. Server 320 is a conventional, non-PoE device, which receives its network data connection from switch 318, which is also a non-PoE device. Network connectivity is provided between PSE switch 302 and switch 318 by way of network cable 314, which is plugged into port 312 of PSE switch 302 and port 316 of switch 318. Although VOIP phone 322 is depicted as a PD, its location is illustrated as not being proximate to PSE switch 302, so alternative means for powering VOIP phone 322 are provided by midspan power injector 324. The configuration of network environment 300 generally illustrates a common environment and shows the ability to mix PoE devices with non-PoE devices as necessary or desired in a fully functional network.

Figure 4:
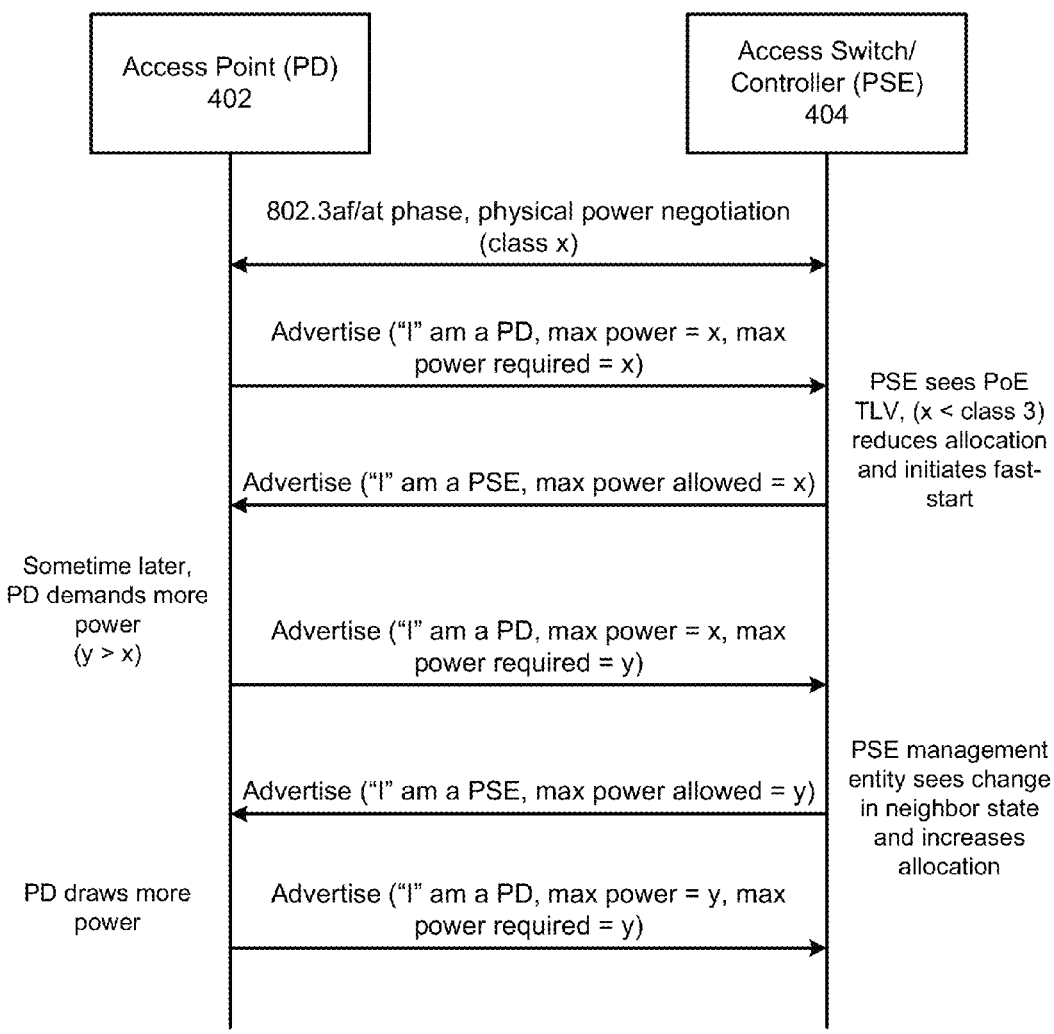
FIG. 4 provides an overview of a Power over Ethernet power up sequence.

FIG. 4 provides an overview of a conventional power up sequence 400 with a Standard PD 402, exemplified as an access point, connected to a Standard PSE 404, exemplified as an network switch/controller. Initially, the Standard PoE detection phase and physical power negotiation communications are exchanged. Following this, the PD 402 sends a message to the PSE 404 indicating it is a powered device and providing power requirements. The PSE 404 receives the message and may reduce the power allocation and initiate fast-starting of power delivery. The PSE 404 also sends a message indicating that it is a power sourcing equipment device and the maximum power the PD 402 is allowed to use. At some point later, the PD 402 may request more power, such as by sending a message indicating that it is a powered device, the current power draw and requesting additional power. Upon receipt, the PSE 404 may identify this change in state and increase power allocation and send a message indicating that it is a power sourcing equipment and the increased maximum power the PD 402 is allowed to use. At this stage the PD 402 can increase its power draw and may send an additional message to PSE 404 indicating the increased power usage.

In various embodiments, these messages are communicated using one or more messaging techniques including, for example, Link Layer Discovery Protocol (LLDP) Media Endpoint Discovery (MED). LLDP is a simple, one-way, point-to-point neighbor discovery protocol using periodic transmissions of suitable network frames. The low-level (Layer 2) frames are not forwarded beyond a single link and are constrained to a single point-to-point link. MED is a standardized LLDP extension for providing automatic discovery of network policies, device location, and the power management negotiation between PDs and PSEs.

Figure 5:
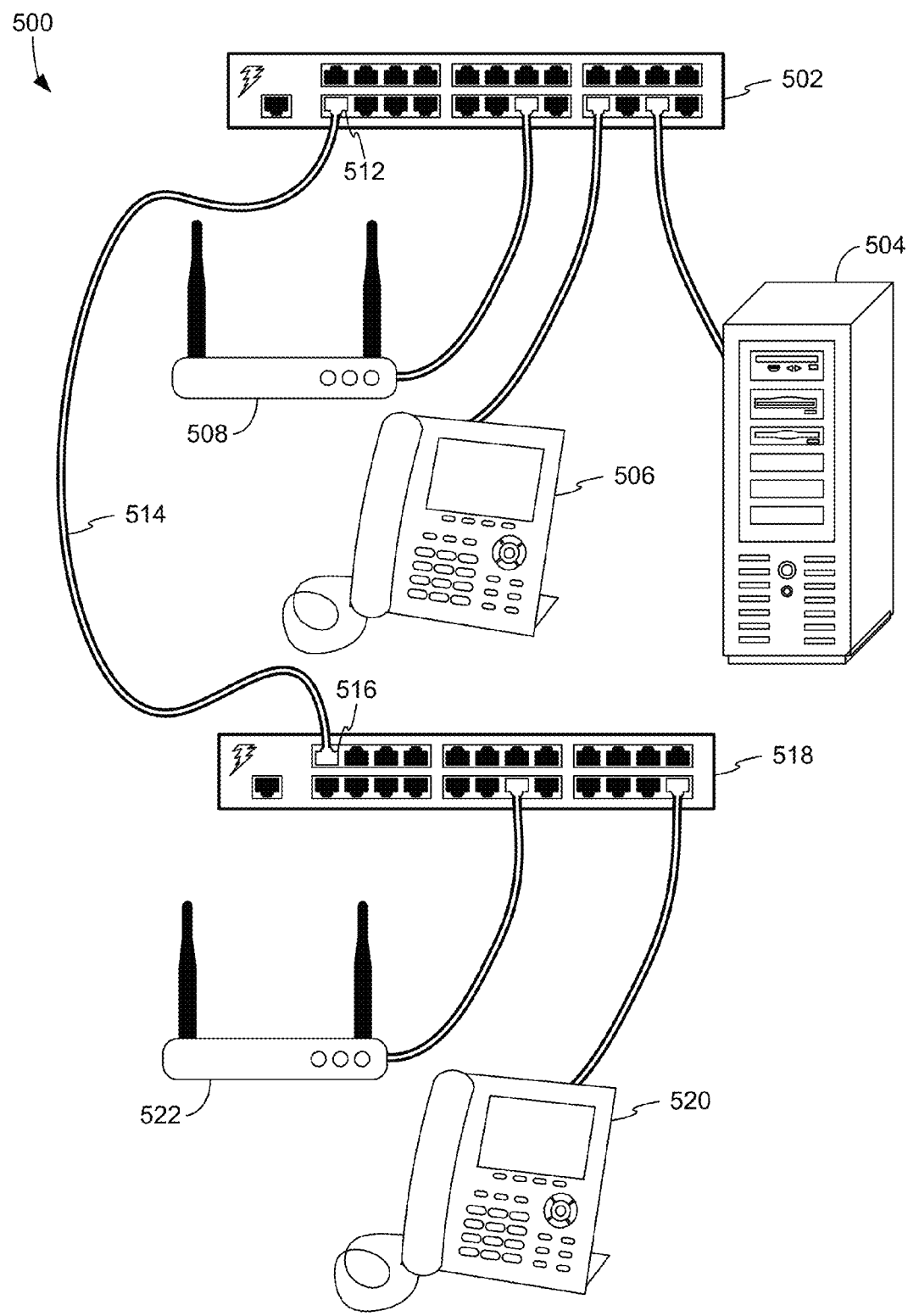
FIG. 5 provides an illustration of an example network communications environment, in accordance with some embodiments.

FIG. 5 provides an overview of an exemplary network environment 500. Network environment 500 includes PSE switch 502, server 504, VOIP phone 506, access point 508, PSE switch 518, VOIP phone 520, and access point 522. Access points 522 and 508 may be PDs that receive power from PSE switches 502 and 518, respectively. VOIP phones 506 and 520 may also be PDs, such as Standard or Legacy PDs, that receive power from PSE switches 502 and 518, respectively. Network connectivity is provided between PSE switch 512 and PSE switch 518 by way of network cable 514, which is plugged into port 512 of PSE switch 502 and port 516 of PSE switch 518.

The environment 500 illustrated in FIG. 5 provides an example of a configuration in which PSE switch 502 and PSE switch 518 may present a Legacy PD signature to one another and/or detect one another as a Legacy PD. Optionally, only one of PSE switch 502 and PSE switch 518 may present a Legacy PD signature to the other and be detected as a Legacy PD.

For example, if PSE switch 518 is falsely detected as a Legacy PD by PSE switch 502, PSE switch 502 may begin injecting power into network cable 514 at port 512. This power will be received by PSE switch 518 at port 516. As described above, such a configuration is not optimal and may result in PSE switch 518 inadvertently failing to provide power to VOIP phone 520 and/or access point 522. Additionally, this configuration may result in PSE switch 518 inadvertently powering down, thus failing to provide power or network connectivity to VOIP phone 520, access point 522, and other connected network devices.

The disclosed techniques for overcoming the inadvertent detection of a PSE device by another PSE device as a Legacy PD include automatically detecting one another as PSE devices and disabling POE for the appropriate network port. No manual intervention is required with the disclosed techniques, as PSEs will disable the PoE power on the appropriate ports on both ends automatically. This further eliminates network administrators from having to first find the port which is causing the issue and then either remove that port or disable PoE on that particular port. The disclosed techniques further reduce the overall system power dissipation, as PoE will be disabled on the port which otherwise would supply power as a result of false PD detection. Advantageously, the disclosed techniques can be implemented on existing PSE systems already in the field through software/firmware upgrades and may not require hardware replacement.

Figure 6:
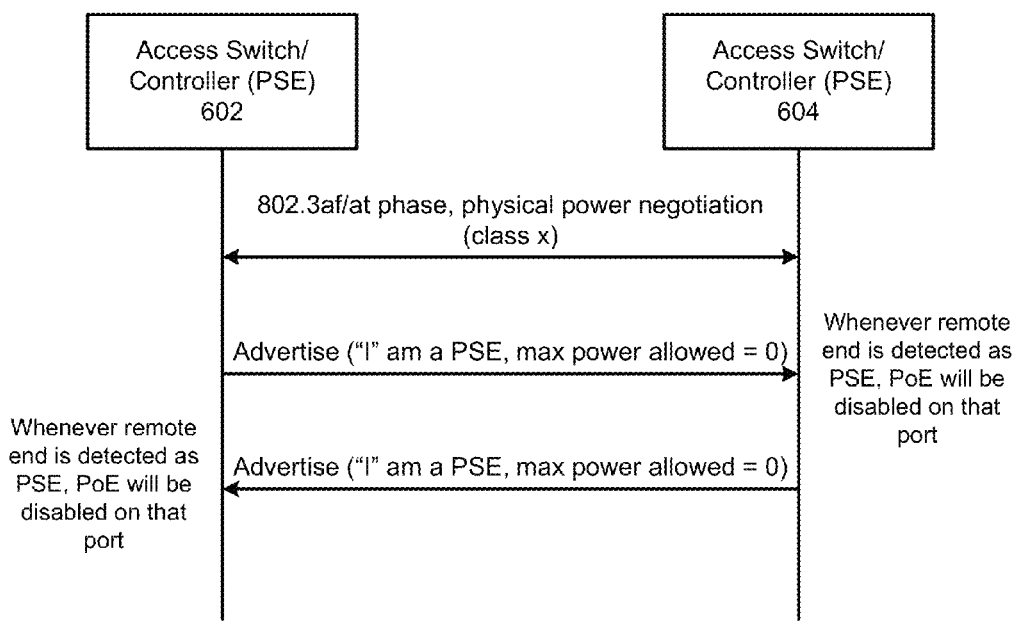
FIG. 6 provides an overview of a sequence for avoiding false detection of a power sourcing equipment as a Legacy powered device.

FIG. 6 provides an overview of a power up sequence 600 with a Standard PSE 602, exemplified as a network switch/controller, connected to a Standard PSE 604, exemplified as a network switch/controller. Initially, the Standard PoE phase and physical power negotiation communications are exchanged. Following this, the PSE 602 sends a message to the PSE 604 indicating it is a power sourcing equipment device and that no power is allowed. The PSE 604 receives the message and may disable PoE at the port on which the message was received. The PSE 604 also sends a message indicating that it is no power is allowed, such as because the device is a power sourcing equipment device. The PSE 602 receives the message and may disable PoE at the port on which the message was received.

Many Standard PSE devices feature the ability to enable or disable PoE individually on a port by port basis. Typically, internal settings on a PSE device, such as a network switch/controller, dictate whether PoE is enabled on any particular port. Such settings may be manually configurable using a web interface or a command line interface. Aspects of the invention make use of messages exchanged between devices to automatically change a port's configuration, if necessary, such as upon receipt of a message indicating that PoE power is not required, that a device is not a PD, or that a device is a PSE. In one embodiment, PoE can be disabled on a port-by-port basis by modifying or creating an entry in a database or table, for example a database or table that may be read by a processor or subroutine in controlling PoE parameters.

The described techniques may be optionally and advantageously implemented using modified or extended versions of existing protocols/standards. For example, one embodiment for implementation of automatic PSE detection and elimination of false PD detection includes making use of Link Layer Discovery Protocol (LLDP) and, optionally, Media Endpoint Discovery (MED), as described above.

Within the LLDP-MED framework, LLDP frames include Type, Length, and Value (TLV) messages that are transmitted by a device for direct receipt by a connected device to provide information, such as about the transmitting device.

Figures 7A, 7B, 7C:
FIG. 7A, FIG. 7B, and FIG. 7C depict various data frame configurations.

LLDP-MED TLV messages follow a format illustrated in FIG. 7A. The type 701 of a TLV message is represented in 7 bits, the length 702 of a TLV message is represented in 9 bits, and the value 703 of a TLV message is represented in as many as 711 bytes.

FIG. 7B illustrates the format of a custom TLV, and shows the type 711, length 712, and value, which is represented as a 24 bit organizationally unique identifier (OUI) 713, an 8 bit subtype 714 and a 0-507 byte information string 715. The type 711 is illustrated in FIG. 7B as a value of 1111111 in binary (i.e., 127 in decimal), which is defined as the type for a custom TLV message.

FIG. 7C illustrates the format of an LLDP-MED Advanced Power Management TLV, and shows the type 721, length 722, and value, which is represented as the 24 bit OUI 723 for the Telecommunications Industry Association (TIA), the 8 bit subtype 724, and the 3 byte information string 725, which is represented as the Extended Power via Media Dependent Interface (MDI) options.

FIG. 7C also illustrates a specific embodiment of values for the LLDP-MED TLV that may be transmitted by a PSE that implements the techniques described herein. As illustrated, type 731 has a value of 127, representing a custom TLV message. Length 732 has a value of 7, representing the length of the LLDP-MED TLV message. OUI 733 is shown as having a value of 00-12-BB, which is the OUI corresponding to the Telecommunications Industry Association (TIA). Subtype 734 is shown as a having a value of 4, which represents the Extended power via MDI subtype. The Extended power via MDI information string 725 is broken down into a 2 bit power type 735, a 2 bit power source 736, a 4 bit power priority 737 and a 2 byte power value 738. The 2 bit power type 735 indicates whether a device is a PSE or PD. The 2 bit power source 736 indicates normal or back-up power conservation. The 4 bit power priority 737 indicates critical, high, or low. The 2 byte power value indicates the power in 0.1 W increments between 0 and 102.3 watts. For implementation of the identification of a PSE device by another PSE device, this may be indicated by the power type 735 having a value indicative of PSE, with all other values in the Extended power via MDI information string 725 optionally set to zero.

Figure 8:
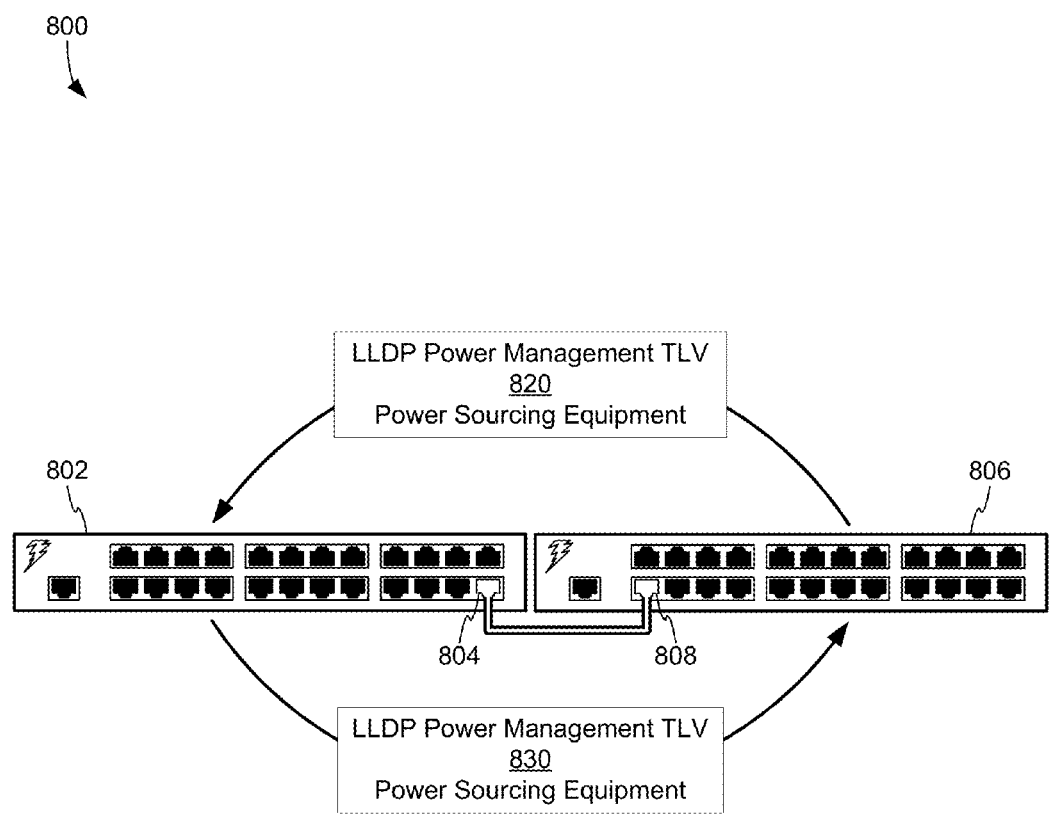
FIG. 8 provides an illustration of an example network communications environment, in accordance with some embodiments.

Once an LLDP frame exchange is established between two devices, a PSE will also exchange the LLDP-MED TLV. FIG. 8 illustrates a network environment 800 in which PSE switch 802 connects to PSE switch 806. As illustrated, an Ethernet cable provides network connectivity between port 804 of PSE switch 802 and port 808 of PSE switch 806. Each of PSE switches 802 and 806 advertise respective LLDP Power Management TLVs 820 and 830 to one another with a power type indicating PSE. Upon receipt of TLVs 820 and 830 with the power type set to PSE, each PSE switch 802 and 806 disables PoE on their respective ports 804 and 808 that the TLVs 820 and 830 were received on. Optionally, disabling PoE includes disabling injection of power. Optionally, disabling PoE includes disabling automatic power negotiation. Optionally, disabling PoE includes disabling Legacy PD detection. In this way, a PSE device will not inadvertently detect another PSE device as a Legacy PD.

Figure 9A:
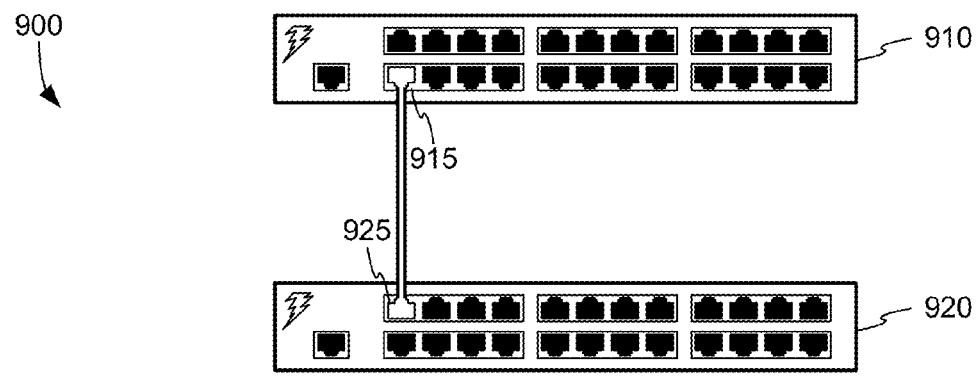
FIG. 9A, FIG. 9B and FIG. 9C provide illustrations of example network communications environments, in accordance with some embodiments.
Figure 9B:
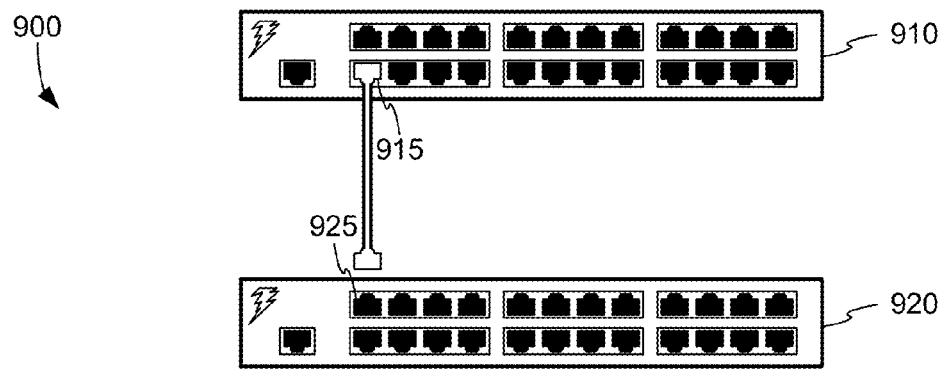
Figure 9C:
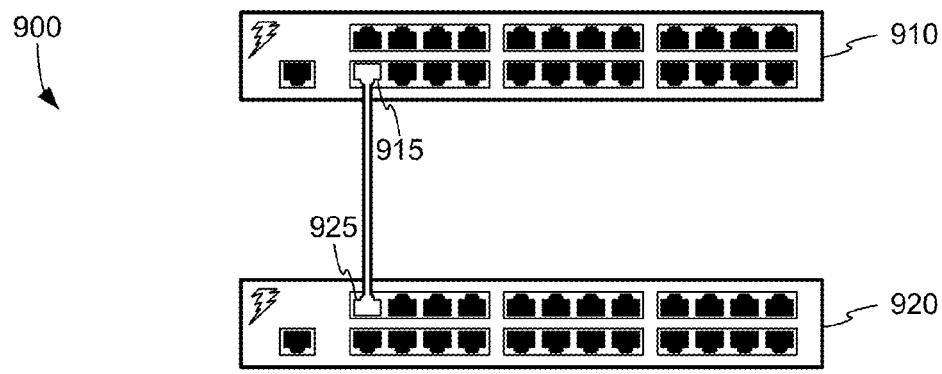

FIG. 9A, FIG. 9B and FIG. 9C illustrate a network environment 900 including PSE switch 910 and 920. In FIG. 9A, an Ethernet cable provides network connectivity between port 915 of PSE switch 910 and port 925 of PSE switch 920. As described above, each of PSE switches 910 and 920 will disable PoE on their respective ports 915 and 925 when LLDP TLVs are exchanged. FIG. 9B illustrates the link between port 915 and port 925 going down, such as due to a disconnected network cable. At this stage, PoE will be re-enabled on the ports 915 and 925 so that the PoE discovery process can be re-initiated upon reestablishing a link at the ports. If the PSE switches 910 and 920 again connect to one another, as illustrated in FIG. 9C, the process of exchanging LLDP-MED TLV is repeated and power is disabled as described previously.

In some embodiments, a link between ports 915 and 925 may be due to a power loss at PSE switch 910 instead of a network cable disconnection. In this case, PoE for port 925 at PSE switch 920 will be re-enabled until the power to PSE switch 910 is restored and network communications between the PSE switches are resumed.

Figure 10:
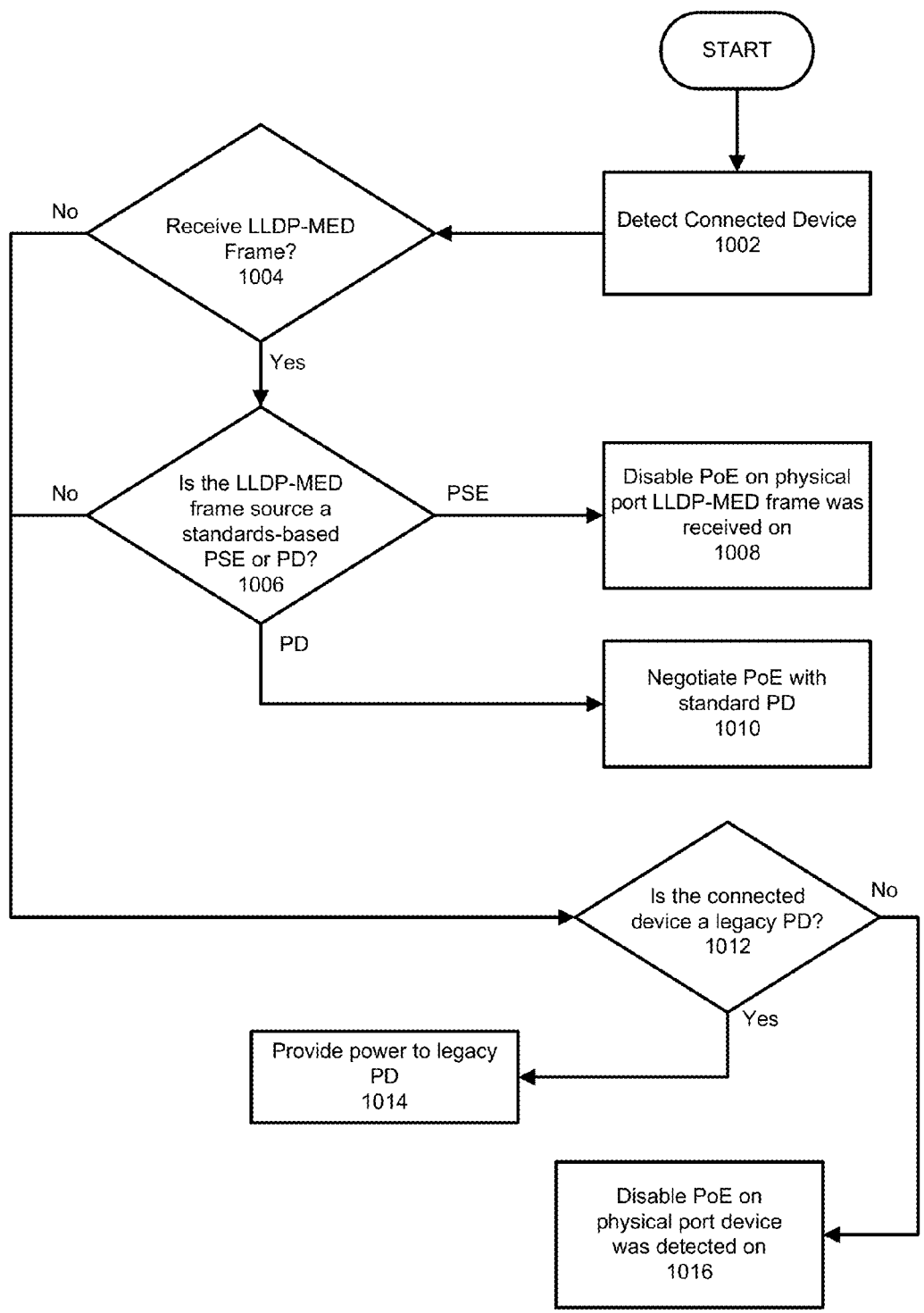
FIG. 10 provides an overview of an exemplary method in accordance with one or more embodiments.

FIG. 10 provides an overview of an exemplary method for use by a PSE device. Initially, at 1002, a connected device is detected. At 1004, it is determined whether an LLDP-MED frame is received by the PSE device. If no LLDP-MED frame is received, the connected device is analyzed at 1012 to determine whether the connected device is a legacy PD. If an LLDP-MED frame is received, at 1006 the LLDP-MED frame is analyzed to determine whether the source of the LLDP frame is a Standard PSE device or a Standard PD. If the LLDP-MED frame is determined to be from a Standard PSE device, at 1008, the PoE is disabled for the port at which the LLDP-MED frame was received. If the LLDP-MED frame is determined to be from a Standard PD, at 1010, power settings for PoE for the Standard PD are negotiated.

At 1012, if the LLDP-MED frame is not from a Standard PSE or Standard PD or if no LLDP-MED frame is received, it is determined whether the device is a Legacy PD. If the device is a Legacy PD, at 1014, power is provided to the Legacy PD. If the device is not a Legacy PD, PoE is disabled on the port at which the device was detected, at 1016.

Figure 11:
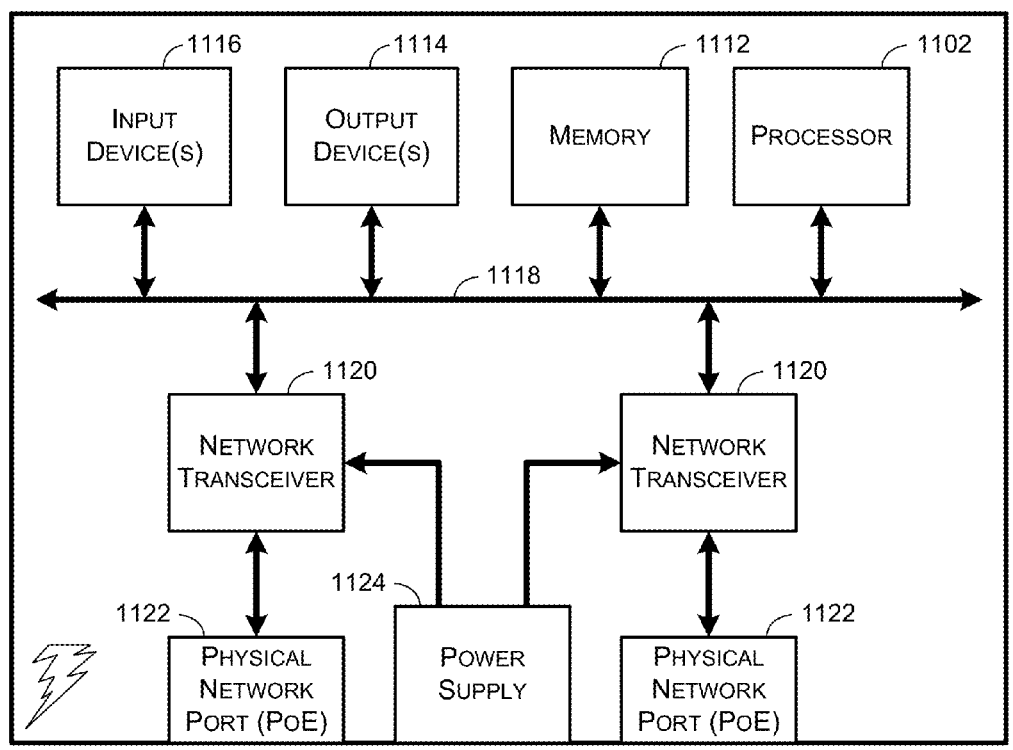
FIG. 11 is a block diagram illustrating an example of a power sourcing equipment device, in accordance with some embodiments.

FIG. 11 illustrates an example of a power sourcing equipment (PSE) device 1100, such as a PoE compliant network switch. Optionally, the PSE device 1100 is compliant with an IEEE 802.3 standard, such as a Power over Ethernet (PoE) standard. The PSE device 1100 includes hardware elements that can be electrically coupled via a bus 1118 (or may otherwise be in communication, as appropriate). In one embodiment, the bus 1118 can be used for the processor(s) 1102 to communicate between cores and/or with the memory 1112. The hardware elements may include one or more processors 1102, including without limitation one or more general-purpose processors and/or one or more special-purpose processors (such as digital signal processing chips, graphics acceleration processors, and/or the like); one or more input devices 1116; one or more output devices 1114; and one or more network transceivers 1120. Optionally, input device 1116 can include numerous devices including, without limitation, a camera, a mouse, a keyboard, a touch sensitive screen, a touch pad, a keypad, and/or the like. Optionally, output device 1114 can include numerous devices including, but not limited to, a display, a printer and/or the like.

PSE device 1100 also includes one or more physical network ports 1122, such as for making network connections over a wired medium, such as a twisted pair Ethernet cable. A physical network port may also be referred to herein as a network port, a data port, a physical port, a hardware port, a physical hardware port, an Ethernet port, a plug, a connector, a connection, a jack, and the like. As used herein these terms are distinct from and used in contrast to the term "port", "software port" or "port number" in the field of Transmission Control Protocol (TCP)/Internet Protocol (IP) networking, where the terms port, software port, and port number are associated with a network software construct that identifies a communications endpoint. In various implementations, physical network ports 1122 are female ports for receiving an 8 pin, 8 conductor modular connector for connection to a twisted pair cable, such as a category 5 cable, a category 5e cable, a category 6 cable, etc. For example, physical network ports 1122 may provide for a wired network connection to an IEEE 802.3 compliant Ethernet network. Optionally, each physical network port 1122 is associated with a network transceiver 1120.

The PSE device 1100 further includes a power supply 1124 that can power the various components of PSE device 1100 and for providing power to external PoE compliant powered devices (PDs). The power supply 1124 may include a voltage converter, a voltage regulator, a switched-mode power supply, a linear power supply, a push-pull power supply, or any other suitable type of power supply. In some embodiments, the PSE device 1100 may include multiple power supplies. For example, a switched-mode power supply may be used to condition input power, and a linear power supply may be used to power the network transceivers 1120, etc. The power supply 1124 may be configured to operate over various ranges of appropriate input voltages. As illustrated, the power supply 1124 is in electrical communication with network transceivers 1120 for providing electrical power to external PDs by way of physical network ports 1122, such as using a PoE standard. Various configurations are available for applying different voltages across different pairs of pins of the physical network ports 1122 and will be understood by the skilled artisan in view of an appropriate PoE standard.

The PSE device 1100 may further include (and/or be in communication with) one or more non-transitory machine-readable storage mediums or storage devices (e.g., memory 1112), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 1112, such as RAM, ROM, FLASH, or disc drive, and executed by processor(s) 1102. The PSE device 1100 can also comprise software elements or functions (e.g., located within the memory 1112), including, for example, an operating system, device drivers, executable libraries, and/or other code, such as one or more application programs, which may comprise computer programs implementing various functions. Memory 1112 may be a non-transitory machine-readable storage medium, processor-readable memory, and/or a computer-readable memory that stores the one or more computer-program products configured to cause the processor(s) 1102 to perform various functions. In other embodiments, various functions described may be performed in hardware.

Figure 12:
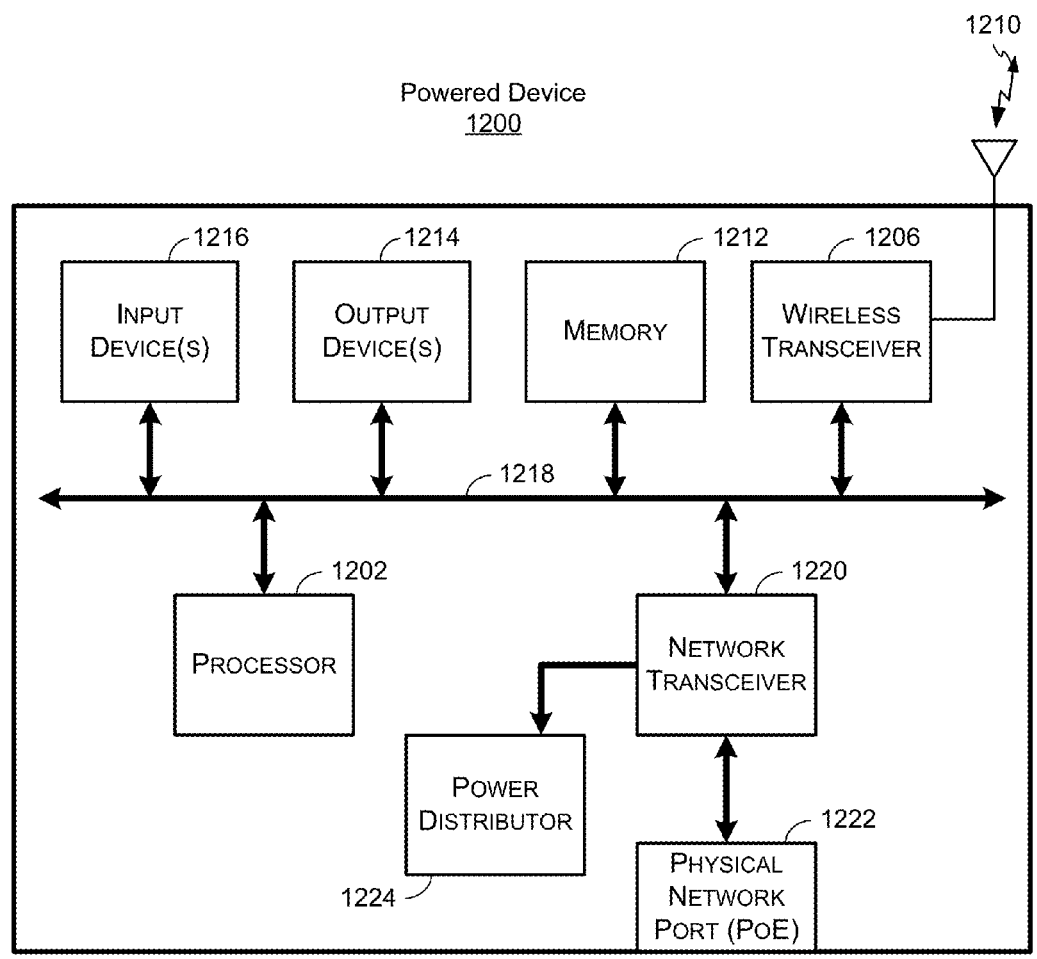
FIG. 12 is a block diagram illustrating an example of a powered device, in accordance with some embodiments.

FIG. 12 illustrates an example of a powered device (PD) 1200. The powered device 1200 may optionally include or otherwise function as a network device. For example, PD 1200 may include or function as a wireless access point, a network appliance, a VOIP phone, an IP camera, etc. As another example, the PD 1200 may include or function as a range extender that may be used to improve signal range and strength within a wireless network by taking an existing signal from another access point and rebroadcasting the signal to create an expanded logical network.

The PD 1200 includes hardware elements that can be electrically coupled via a bus 1218 (or may otherwise be in communication, as appropriate). In one embodiment, the bus 1218 can be used for the processor(s) 1202 to communicate between cores and/or with the memory 1212. The hardware elements may include one or more processors 1202, including without limitation one or more general-purpose processors and/or one or more special-purpose processors (such as digital signal processing chips, graphics acceleration processors, and/or the like); one or more input devices 1216, which can include without limitation one or more buttons, a keyboard, a keypad, a touch sensitive screen, a touch pad, and/or the like; and one or more output devices 1214, which can include, without limitation, a display, light or sound indicators, and/or the like.

The PD 1200 optionally includes one or more wireless transceivers 1206 connected to the bus 1218, for example if the PD 1200 is a wireless access point. The wireless transceiver 1206 may be operable to receive and transmit wireless signals (e.g., a wireless signal 1210) via an antenna 1208. The wireless transceiver 1206 may include a transceiver radio designed to transmit and receive signals in compliance with a wireless communications standard. Exemplary wireless communications standards include, but are not limited to, IEEE 802.11 (also referred to herein as WiFi or Wi-Fi), Bluetooth, ZigBee, UWB, wireless USB and Z-Wave. In various embodiments, a wireless communications standard specifies frequency bands, channels, data packet characteristics and other transmission characteristics necessary for inter device-communication. For example, wireless transceiver 1206 may include a 2.4 GHz WiFi circuit or a 5 GHz WiFi circuit. Accordingly, the PD 1200 may include a single WiFi circuit for a WiFi communications, and a single Bluetooth circuit for Bluetooth communications. In some embodiments, the PD 1200 may include multiple wireless transceivers (not shown) for each available communications standard. The antenna 1208 may include multiple band antennas that can transmit and/or receive signals over different frequency bands.

The PD 1200 may further include a radio frequency (RF) circuit. In some embodiments, the wireless transceiver 1206 may be integrated with or coupled to the RF circuit so that the RF circuit includes the wireless transceiver 1206. In some embodiments, the wireless transceiver 1206 and the RF circuit are separate components. The RF circuit may include a RF amplifier that may amplify signals received over antenna 1208. The RF circuit may also include a power controller that may be used to adjust signal amplification by the RF amplifier. The power controller may be implemented using hardware, firmware, software, or any combination thereof.

The wireless signal 1210 may be transmitted via a wireless communication channel. In some embodiments, the wireless communication channel may be any wireless communication channel established between two or more devices, such as a wireless local area network (e.g., a WiFi network), a Personal Access Network (e.g., between Bluetooth, ZigBee, UWB or wireless USB compatible devices), or a cellular network (e.g., a GSM, WCDMA, LTE, CDMA2000 network). The wireless transceiver 1206 may be configured to receive various radio frequency (RF) signals (e.g., signal 1210) via antenna 1208, respectively, from one or more other access points, network devices, beacons and/or the like. PD 1200 may also be configured to decode and/or decrypt various signals received from one or more access points, network devices, wireless devices, and/or the like.

The PD 1200 also includes circuitry at power distributor 1224 for receiving voltage, current or power via a Power over Ethernet connection and providing power to various components of PD 1200. Power over Ethernet support may be provided by network transceiver 1220. Network transceiver 1220 can provide for network connections to external devices via any standardized or specialized network connection, such as IEEE 802.3, and for receiving power through physical network port 1222. In an exemplary embodiment, network interface 1220 provides support for a wired Ethernet connection to a network. Other wired network technologies are contemplated for network connections, as will be understood by the skilled artisan; however, due to its ubiquitous nature and support for Power over Ethernet, wired Ethernet over twisted pairs may be preferentially employed. In one implementation, physical network port 1222 is a female port for receiving an 8 pin, 8 conductor modular connector for connection to a twisted pair cable, such as a category 5 cable, a category 5e cable, a category 6 cable, etc. For example, physical network port 1222 may provide for a wired network connection to an IEEE 802.3 compliant Ethernet network.

The PD 1200 may further include (and/or be in communication with) one or more non-transitory machine-readable storage mediums or storage devices (e.g., memory 1212), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 1212, such as RAM, ROM, FLASH, or disc drive, and executed by processor(s) 1202. The PD 1200 can also comprise software elements (e.g., located within the memory 1212), including, for example, an operating system, device drivers, executable libraries, firmware, and/or other code, such as one or more application programs, which may comprise computer programs implementing the functions provided by various embodiments, and/or may be designed to implement methods and/or configure systems, as described herein.

Figure 13:
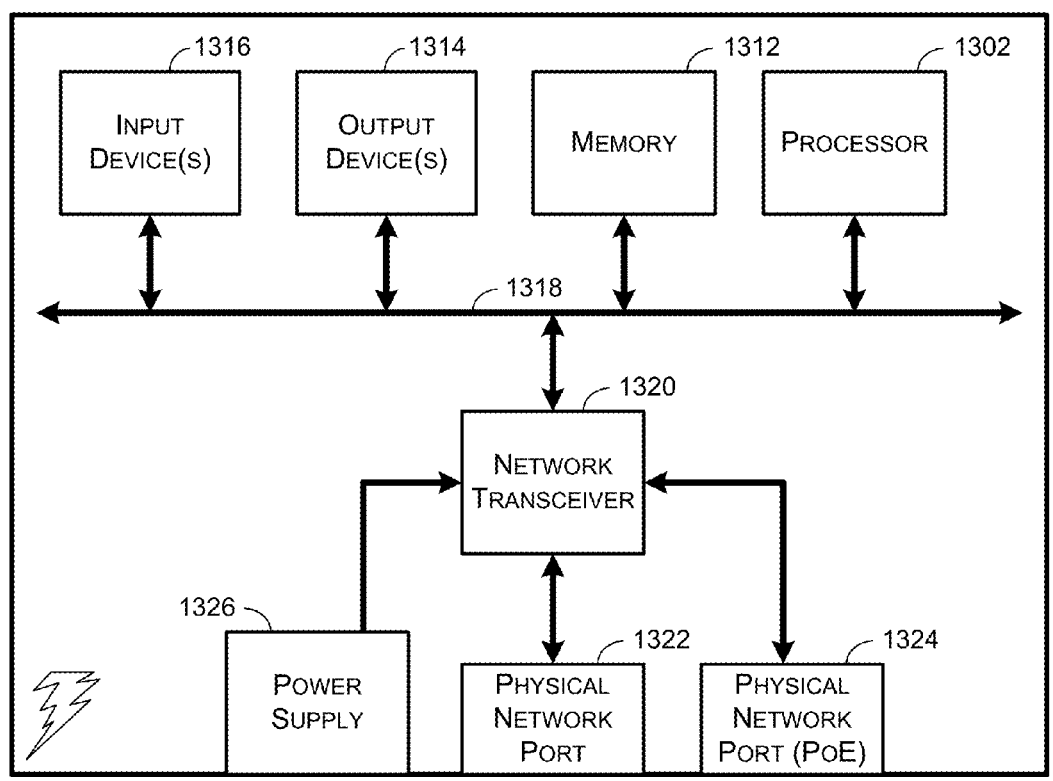
FIG. 13 is a block diagram illustrating an example of a midspan power injector, in accordance with some embodiments.

FIG. 13 illustrates an example of a midspan power injector device 1300. Optionally, the power injector device 1300 is compliant with an IEEE 802.3 standard, such as a Power over Ethernet (PoE) standard. The power injector device 1300 includes hardware elements that can be electrically coupled via a bus 1318 (or may otherwise be in communication, as appropriate). In one embodiment, the bus 1318 can be used for the processor(s) 1302 to communicate between cores and/or with the memory 1312. The hardware elements may include one or more processors 1302, including without limitation one or more general-purpose processors and/or one or more special-purpose processors (such as digital signal processing chips, graphics acceleration processors, and/or the like); one or more input devices 1316; one or more output devices 1314; and one or more network transceivers 1320. Optionally, input device 1316 includes, without limitation, one or more buttons or switches. Optionally, output device 1314 includes, without limitation, one or more light emitting diodes, such as for indicating a status of power injector device 1300.

Power injector device 1300 also includes one or more physical network ports 1322 and 1324, such as for making network connections over a wired medium, such as a twisted pair Ethernet cable. As illustrated, physical network port 1322 is suitable for making a data connection with another network device, while physical network port 1324 is suitable for providing both data and power to a Power over Ethernet powered device. For example, physical network ports 1322 and 1324 may provide for a wired network connection to an IEEE 802.3 compliant Ethernet network device. In various implementations, physical network ports 1322 and 1324 are female ports for receiving an 8 pin, 8 conductor modular connector for connection to a twisted pair cable, such as a category 5 cable, a category 5e cable, a category 6 cable, etc. Optionally, each physical network port 1322 and 1324 is associated with separate network transceivers, which may communicate with one another, such as via bus 1318.

The power injector device 1300 further includes a power supply 1326 that can power the various components of power injector device 1300 as well as for providing power to physical network port 1324 and powered devices connected thereto. The power supply 1326 may include a voltage converter, a voltage regulator, a switched-mode power supply, a linear power supply, a push-pull power supply, or any other suitable type of power supply. The power supply 1326 may be configured to operate over various ranges of appropriate input voltages. As illustrated, the power supply 1326 is in electrical communication with network transceivers 1320 for providing electrical power to external powered devices (PDs) by way of physical network ports 1322, such as using a PoE standard. Various configurations are available for applying different voltages across different pairs of pins of the physical network ports 1322 and will be understood by the skilled artisan in view of an appropriate PoE standard.

The power injector device 1300 may further include (and/or be in communication with) one or more non-transitory machine-readable storage mediums or storage devices (e.g., memory 1312), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 1312, such as RAM, ROM, FLASH, or disc drive, and executed by processor(s) 1302. The power injector device 1300 can also comprise software elements or functions (e.g., located within the memory 1312), including, for example, an operating system, device drivers, executable libraries, and/or other code, such as one or more application programs, which may comprise computer programs implementing various functions. Memory 1312 may be a non-transitory machine-readable storage medium, processor-readable memory, and/or a computer-readable memory that stores the one or more computer-program products configured to cause the processor(s) 1302 to perform various functions. In other embodiments, various functions described may be performed in hardware.

Figure 14:
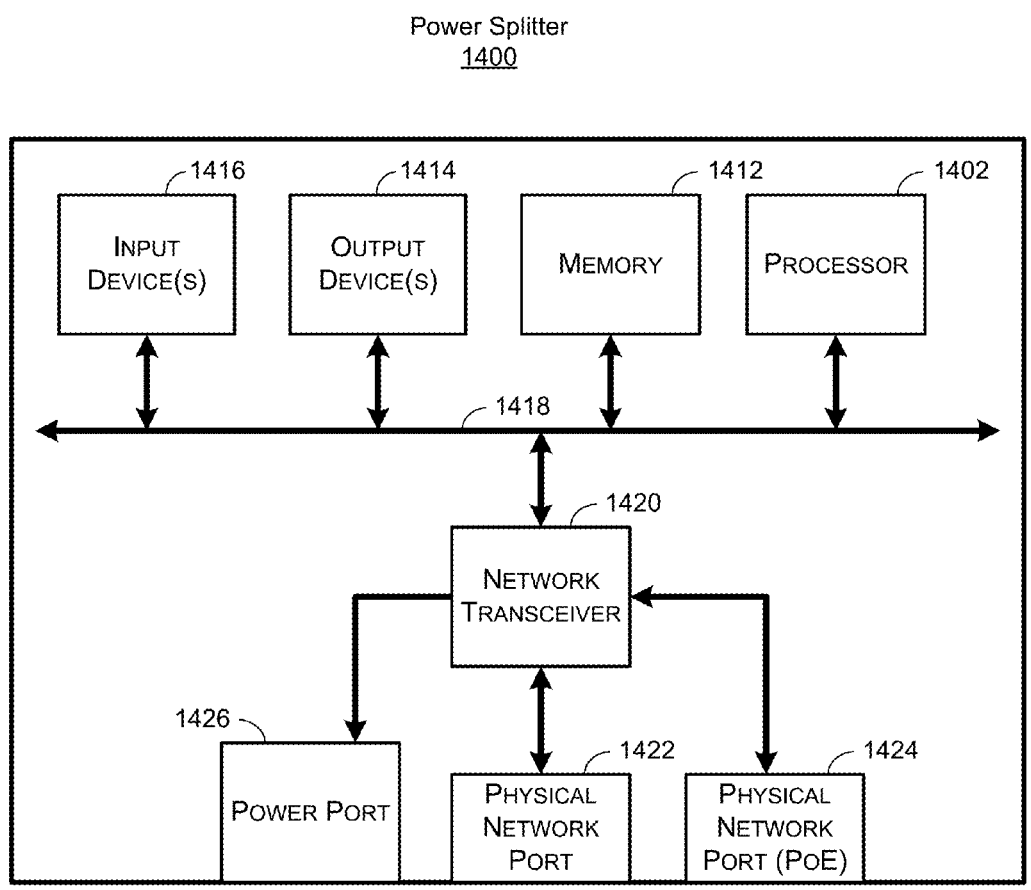
FIG. 14 is a block diagram illustrating an example of a power splitter, in accordance with some embodiments.

FIG. 14 illustrates an example of a power splitter 1400. The power splitter 1400 includes hardware elements that can be electrically coupled via a bus 1418 (or may otherwise be in communication, as appropriate). In one embodiment, the bus 1418 can be used for the processor(s) 1402 to communicate between cores and/or with the memory 1412. The hardware elements may include one or more processors 1402, including without limitation one or more general-purpose processors and/or one or more special-purpose processors (such as digital signal processing chips, graphics acceleration processors, and/or the like); one or more input devices 1416, which can include, without limitation, one or more buttons or switches; and one or more output devices 1414, which can include, without limitation, a light emitting diode.

Network transceiver 1420 can provide for network connections to external devices via any standardized or specialized network connection, such as IEEE 802.3, and for receiving power through physical network port 1424. In an exemplary embodiment, network interface 1420 provides support for a wired Ethernet connection to a network. Other wired network technologies are contemplated for network connections, as will be understood by the skilled artisan; however, due to its ubiquitous nature and support for Power over Ethernet, wired Ethernet over twisted pairs may be preferentially employed.

The power splitter 1400 also includes circuitry (not shown) for receiving voltage, current or power via a Power over Ethernet connection. As illustrated, the physical network port 1424 receives power and data via a Power over Ethernet type connection. Power is passed to power port 1426 for providing electrical power to external devices, such as non-PoE compliant network appliances, VOIP phones, IP cameras, wireless access points, etc. Power port 1426 typically provides DC voltage for use by the external network device and power splitter may include one or more DC-DC converters or DC voltage regulators to provide a suitable voltage/current via power port 1426. Physical network port 1422 is useful for making a network connection to the external network device. For example, physical network ports 1422 and 1424 may provide for a wired network connection to IEEE 802.3 compliant Ethernet network devices. In various implementations, physical network ports 1422 and 1424 are female ports for receiving an 8 pin, 8 conductor modular connector for connection to a twisted pair cable, such as a category 5 cable, a category 5e cable, a category 6 cable, etc. Optionally, each physical network port 1422 and 1424 is associated with separate network transceivers, which may communicate with one another, such as via bus 1418.

The power splitter 1400 may further include (and/or be in communication with) one or more non-transitory machine-readable storage mediums or storage devices (e.g., memory 1412), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 1412, such as RAM, ROM, FLASH, or disc drive, and executed by processor(s) 1402. The power splitter 1400 can also comprise software elements (e.g., located within the memory 1412), including, for example, an operating system, device drivers, executable libraries, firmware, and/or other code, such as one or more application programs, which may comprise computer programs implementing the functions provided by various embodiments, and/or may be designed to implement methods and/or configure systems, as described herein.

Merely by way of example, one or more procedures described with respect to the processes or methods discussed above, for example as described with respect to FIG. 10 or any portion thereof, may be implemented as code and/or instructions executable by a computer or device (and/or a processor within a computer or device); in an aspect, then, such code and/or instructions can be used to configure and/or adapt a general purpose computer (or other device) to perform one or more operations in accordance with the described methods. Such functions or code may include code to perform the steps described above with respect to FIG. 10 and portions thereof. The memory may be a non-transitory machine-readable storage medium, processor-readable memory, and/or a computer-readable memory that stores the one or more computer-program products configured to cause the processor(s) to perform the functions described. In other embodiments, one or more of the functions described may be performed in hardware. Aspects of the disclosed methods, when performed by a general purpose computer, allow the general purpose computer to perform more efficiently, such as by performing an operation in fewer steps or using less memory or processing time, than prior methods. Further, performance of aspects of the disclosed methods by a general purpose computer may transform the general purpose computer into a special purpose computer, such as a network device, a wireless access point, a wireless client, etc. Aspects of the disclosed methods, when performed by a general purpose computer, further allow the general purpose computer to perform new functions and/or to perform functions in new ways, such as in more useful orders. For example, aspects of the disclosed methods achieve simplified and/or more efficient operation of network devices, such as client devices and wireless access point, as well as efficiency gains in operation of wireless networking and use of the radio frequency medium.

A set of these instructions and/or code might be stored on a non-transitory machine-readable storage medium, such as the memory. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by a computer or device and/or might take the form of source and/or installable code, which, upon compilation and/or installation on the computer or device (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A system comprising:
    a computer processor; and
    a non-transitory machine-readable storage medium having stored thereon machine readable instructions to cause the computer processor to:
        receive a link layer discovery protocol (LLDP) frame at a network device, wherein the network device is a power sourcing equipment (PSE) device;
        analyze the LLDP frame, wherein the analyzing includes identifying a source of the LLDP frame as another PSE device;
        identify a physical network port of the network device, wherein the physical network port is associated with receipt of the LLDP frame; and
        disable transmission of power over the physical network port.

2. The system of claim 1, wherein the instructions to cause the computer processor to analyze the LLDP frame include instructions to identify the source of the LLDP frame as a legacy PSE device.

3. The system of claim 1, wherein the LLDP frame is a Link Layer Discovery Protocol Media Endpoint Discovery (LLDP-MED) frame.

4. The system of claim 1, wherein the LLDP frame includes data indicating a power type as PSE, and wherein the identifying of the source of the LLDP frame as the another PSE device is based on the data indicating the power type as PSE in the LLDP frame.

5. The system of claim 1, wherein the LLDP frame includes a custom type-length-value structure, wherein the custom type-length-value structure includes data indicating a power type as PSE, and wherein the identifying of the source of the LLDP frame as the another PSE device is based on the data indicating the power type as PSE in the custom type-length-value structure.

6. The system of claim 1, wherein the network device is compliant with a Power over Ethernet standard, and the another PSE device is compliant with the Power over Ethernet standard.

7. The system of claim 1, wherein the instructions to cause the computer processor to disable transmission of power over the physical network port include instructions to disable legacy powered device detection for the physical network port.

8. The system of claim 1, wherein the instructions to cause the computer processor to disable transmission of power over the physical network port include instructions to disable Power over Ethernet for the physical network port.

9. The system of claim 1, wherein the instructions to cause the computer processor to disable transmission of power over the physical network port include instructions to disable automatic power negotiation for the physical network port.

10. The system of claim 1, wherein the instructions to cause the computer processor to disable transmission of power over the physical network port include instructions to disable the injection of power or voltage by the physical network port.

11. The system of claim 1, wherein the non-transitory machine-readable storage medium includes instructions to cause the computer processor to:
    detect an interruption of a network connection at the physical network port; and
    enable transmission of power using the physical network port.

12. The system of claim 1, wherein the machine-readable storage medium includes instructions to cause the processor to:
    transmit an additional LLDP frame including data identifying the network device as a PSE device, wherein receiving the additional LLDP frame at an additional PSE device causes the additional PSE device to identify an additional physical network port of the additional PSE device, wherein the additional network port is associated with receipt of the additional LLDP frame, and wherein receiving the additional LLDP frame at the additional PSE device causes the additional PSE device to disable transmission of power over the additional physical network port.

13. The system of claim 1, wherein the network device is an endpoint device or a midspan device.

14. The system of claim 1, wherein the PSE device is a first Power over Ethernet (PoE) PSE device to supply power to a powered device, and the another PSE device is a second PoE PSE device to supply power to a powered device.

15. The system of claim 14, wherein the first PoE PSE device is a switch comprising a plurality of ports to connect to devices.

16. A method, comprising:
    receiving a link layer discovery protocol (LLDP) frame at a physical network port of a first Power over Ethernet (PoE) power sourcing equipment (PSE) device that supplies power to a powered device;
    analyzing the LLDP frame, wherein the analyzing includes identifying a source of the LLDP frame as a second PoE PSE device that supplies power to a powered device;
    identifying the physical network port of the first PoE PSE device, the physical network port receiving the LLDP frame; and
    disabling transmission of power over the physical network port.

17. The method of claim 16, wherein the LLDP frame is a Link Layer Discovery Protocol Media Endpoint Discovery (LLDP-MED) frame.

18. The method of claim 16, wherein the LLDP frame includes data indicating a power type as PSE, and wherein the identifying of the source of the LLDP frame as the second PoE PSE device is based on the data indicating the power type as PSE in the LLDP frame.

19. A non-transitory machine-readable medium having stored thereon instructions to cause a first power sourcing equipment (PSE) device to:
    receive a link layer discovery protocol (LLDP) frame at the first PSE device;

analyze the LLDP frame, wherein the analyzing includes identifying a source of the LLDP frame as a second PSE device;

identify a physical network port of the first PSE device, wherein the physical network port is associated with receipt of the LLDP frame; and disable transmission of power over the physical network port.

20. The non-transitory machine-readable medium of claim 19, wherein the first PSE device is a first Power over Ethernet (PoE) PSE device to supply power to a powered device, and the second PSE device is a second PoE PSE device to supply power to a powered device.

21. The non-transitory machine-readable medium of claim 19, wherein the LLDP frame includes data indicating a power type as PSE, and wherein the identifying of the source of the LLDP frame as the second PSE device is based on the data indicating the power type as PSE in the LLDP frame.

* * * * *